(12) United States Patent
Osawa et al.

(10) Patent No.: US 10,486,508 B2
(45) Date of Patent: Nov. 26, 2019

(54) VEHICLE DOOR FRAME

(71) Applicant: SHIROKI CORPORATION, Fujisawa-shi, Kanagawa (JP)

(72) Inventors: Shigenobu Osawa, Aichi (JP); Hiroaki Yamazaki, Aichi (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 135 days.

(21) Appl. No.: 15/710,144

(22) Filed: Sep. 20, 2017

(65) Prior Publication Data

US 2018/0079285 A1 Mar. 22, 2018

(30) Foreign Application Priority Data

Sep. 21, 2016 (JP) ................. 2016-184510

(51) Int. Cl.
*B60J 5/04* (2006.01)

(52) U.S. Cl.
CPC ........... *B60J 5/0402* (2013.01); *B60J 5/0469* (2013.01)

(58) Field of Classification Search
CPC ....... B60J 5/0401; B60J 5/0402; B60J 5/0469
See application file for complete search history.

(56) References Cited

U.S. PATENT DOCUMENTS

| | | | | |
|---|---|---|---|---|
| 5,735,081 A * | 4/1998 | Yamanaka | ............. | B60J 5/0402 29/897.2 |
| 6,039,384 A * | 3/2000 | Schulte | ................. | B60J 5/0402 296/146.2 |
| 8,172,125 B2 * | 5/2012 | Okada | .................... | B60J 5/0402 228/135 |
| 10,160,296 B2 * | 12/2018 | Makita | ................... | B60J 5/0402 |
| 2006/0181107 A1 * | 8/2006 | Nishikawa | ............. | B60J 5/0402 296/146.2 |
| 2009/0115220 A1 * | 5/2009 | Takeuchi | ............... | B60J 5/0402 296/146.6 |
| 2011/0099912 A1 * | 5/2011 | Ohtake | .................. | B60J 5/0402 49/502 |
| 2014/0021739 A1 * | 1/2014 | Shimizu | .................... | B60J 5/04 296/146.5 |
| 2014/0137412 A1 * | 5/2014 | Yamada | .................. | B60J 5/0402 29/897.2 |
| 2014/0217772 A1 | 8/2014 | Yamada et al. | | |
| 2016/0167491 A1 * | 6/2016 | Nakaguchi | ............. | B60J 5/0402 49/504 |

FOREIGN PATENT DOCUMENTS

JP H06-286463 A 10/1994
JP 2014-151659 A 8/2014

* cited by examiner

*Primary Examiner* — Justin B Rephann
(74) *Attorney, Agent, or Firm* — Buchanan Ingersoll & Rooney PC

(57) ABSTRACT

A vehicle door frame includes an upper sash and a side sash. The upper sash includes a first end face that extends in an oblique direction crossing a horizontal direction and a vertical direction, and a lower outer face. The side sash includes a second end face and an internal space. The top end face includes a first face that abuts on the rear end face, and a second face that is inclined with respect to the first face and directed upward and is provided with an aperture being one end of the internal space. The lower outer face of the upper sash covers the inner peripheral face and the aperture.

3 Claims, 5 Drawing Sheets

VEHICLE DOOR FRAME

CROSS-REFERENCE TO RELATED APPLICATIONS

This application is based upon and claims the benefit of priority from Japanese Patent Application No. 2016-184510, filed Sep. 21, 2016, the entire contents of which are incorporated herein by reference.

FIELD

An embodiment described herein relates generally to a vehicle door frame.

BACKGROUND

Conventionally, there has been known a vehicle door frame that includes an upper sash and a hollow side sash which abut on and are joined to each other in the corner of a vehicle door (for example, Japanese Patent Application Laid-open Publication No. 6-286463 and No. 2014-151659).

In such a vehicle door frame, for example, air may enter the internal space of the side sash from a joint between the upper sash and the side sash during traveling of a vehicle, generating wind noise.

An object of the present invention is to provide a vehicle door frame having a novel structure which can prevent occurrence of wind noise.

SUMMARY

According to one embodiment, a vehicle door frame includes an upper sash that includes a first end face and a lower outer face, the first face located in a top corner of a vehicle door and extending in an oblique direction crossing a horizontal direction and a vertical direction; and a side sash that includes a second end face located in the corner, and an internal space, wherein the second end face includes a first face and a second face, the first face extending in the oblique direction to abut on the first end face, the second face located between a plane extending from the first face in the oblique direction and the lower outer face, inclined with respect to the first face and directed upward, and provided with an aperture which is an end of the internal space, and the lower outer face covers the second face and the aperture.

DETAILED DESCRIPTION

An embodiment of the present invention will now be described. The configuration of the following embodiment and actions and results (effects) caused by the configuration have been presented by way of example. The present invention can be achieved by configurations other than the configuration disclosed in the following embodiment. The present invention can attain at least one of the various kinds of effects (including derivative effects) by the configuration.

Figure 1:
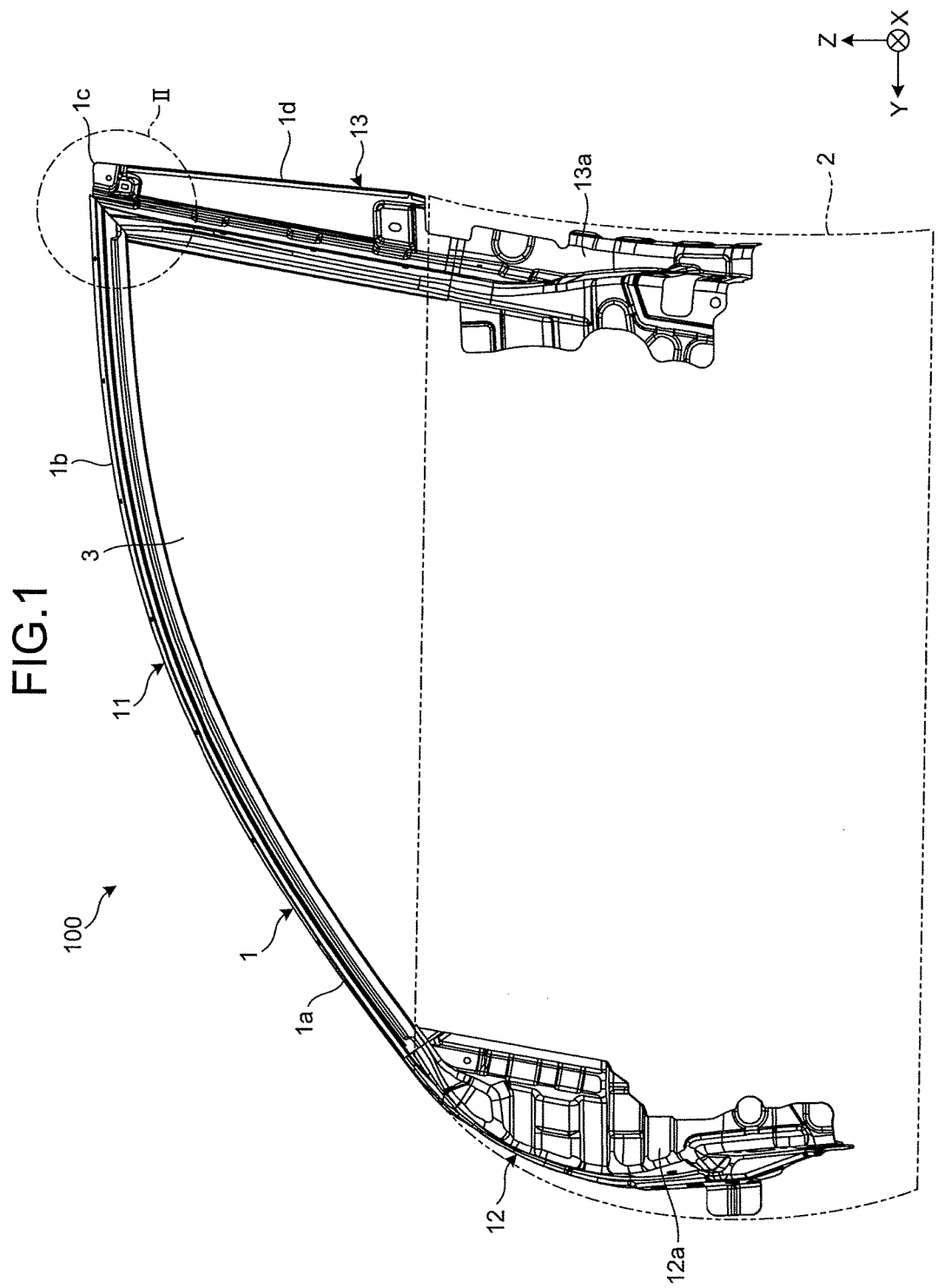
FIG. 1 is a schematic, exemplary view of a vehicle front door according to an embodiment.
Figure 2:
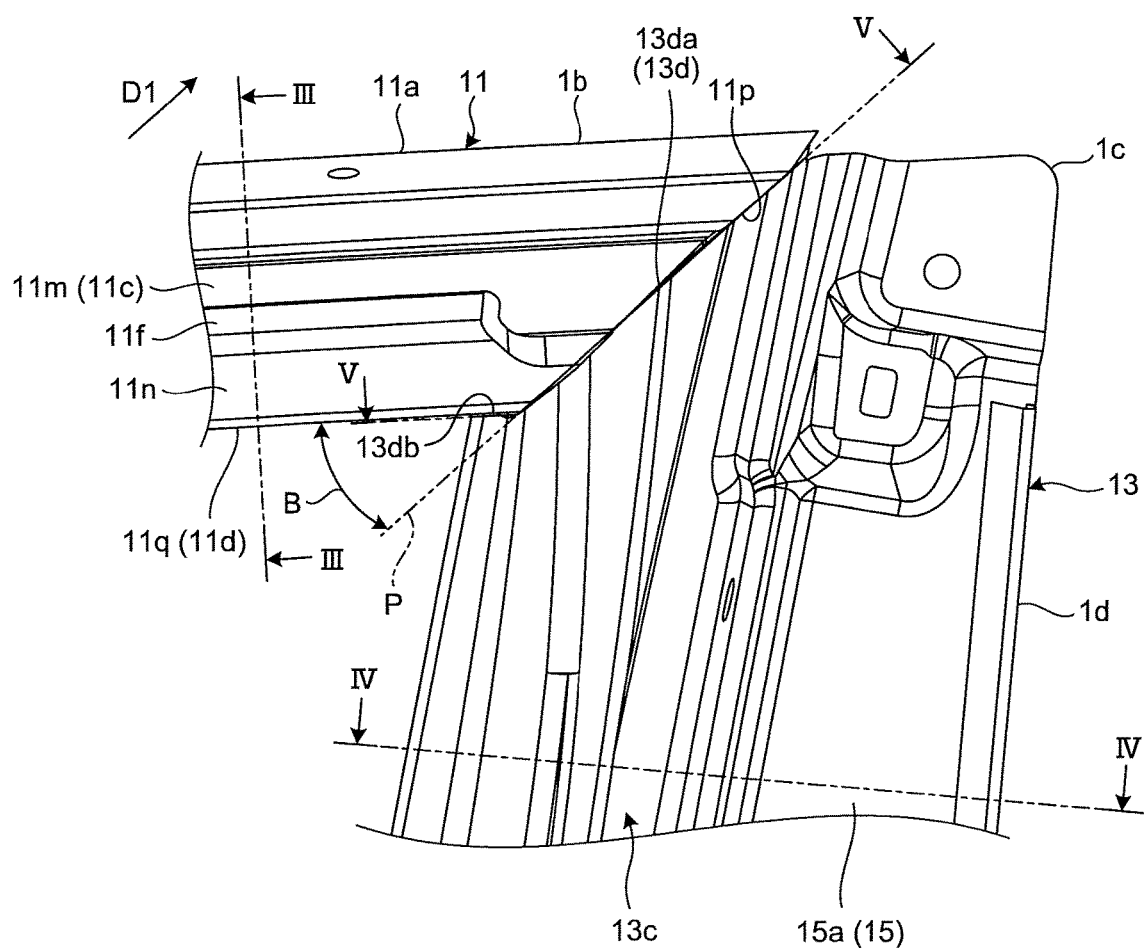
FIG. 2 is an enlarged view of a part indicated by the Roman numeral II in FIG. 1.

FIG. 1 is a schematic, exemplary view of a front door 100 according to an embodiment, and FIG. 2 is an enlarged view of a part indicated by the Roman numeral II in FIG. 1. In the drawings, X, Y, and Z directions are defined for convenience. X, Y, and Z indicate rightward (to outside a vehicle) in a vehicle width direction, forward in a vehicle front-rear direction, and upward in a vehicle vertical direction, respectively.

The front door 100 illustrated in FIG. 1 is a right-side front door of a vehicle. The front door 100 includes a door frame 1 and a door panel 2. The door frame 1 is fixed to the door panel 2, projecting upward from the door panel 2. The front door 100 is provided with a window aperture 3 between the door frame 1 and the top end of the door panel 2, and a door glass (not illustrated) elevates and descends in this window aperture 3. The door frame 1 includes a glass run (not illustrated) formed of an elastic material in the window aperture 3 to hold the edge of the door glass. The front door 100 is an example of a door for a vehicle.

The door frame 1 includes a front edge 1a that extends upward and obliquely rearward from a front end of the door panel 2, a top edge 1b that extends rearward from the front edge 1a, and a rear edge 1d that extends downward from the top edge 1b. As illustrated in FIGS. 1 and 2, the top edge 1b and the rear edge 1d are connected to each other at a corner 1c. The corner 1c is the top rear corner of the front door 100 and the door frame 1. The door frame 1 includes an upper sash 11 that includes the front edge 1a and the top edge 1b, and a side sash 13 that includes the rear edge 1d. Thus, the upper sash 11 and the side sash 13 are connected to each other at the corner 1c. The upper sash 11 is fixed to the door panel 2 through a fixture 12a of a lower member 12, and the side sash 13 is fixed to the door panel 2 through a fixture 13a of the side sash 13. With the front door 100 closed, the upper sash 11 lies along a roof panel (not illustrated) of a vehicle body, and the side sash 13 lies along a center pillar (not illustrated) of the vehicle body. The upper sash 11 and the side sash 13 are provided with weather strips (not illustrated) formed of an elastic material on a roof panel side and a center pillar side, respectively. With the front door 100 closed, the weather strips are elastically deformed so as to liquid-tightly close the front door 100 and the vehicle body. A component such as a lock mechanism that locks the front door 100 to the vehicle body (center pillar) is fixed to the fixture 13a. Hereinafter, a window aperture side of the door frame 1 may be referred to as an inner periphery, and the opposite side of the door frame 1 may be referred to as an outer periphery. The fixture 13a may be referred to as a lock reinforcement or a bracket.

Figure 3:
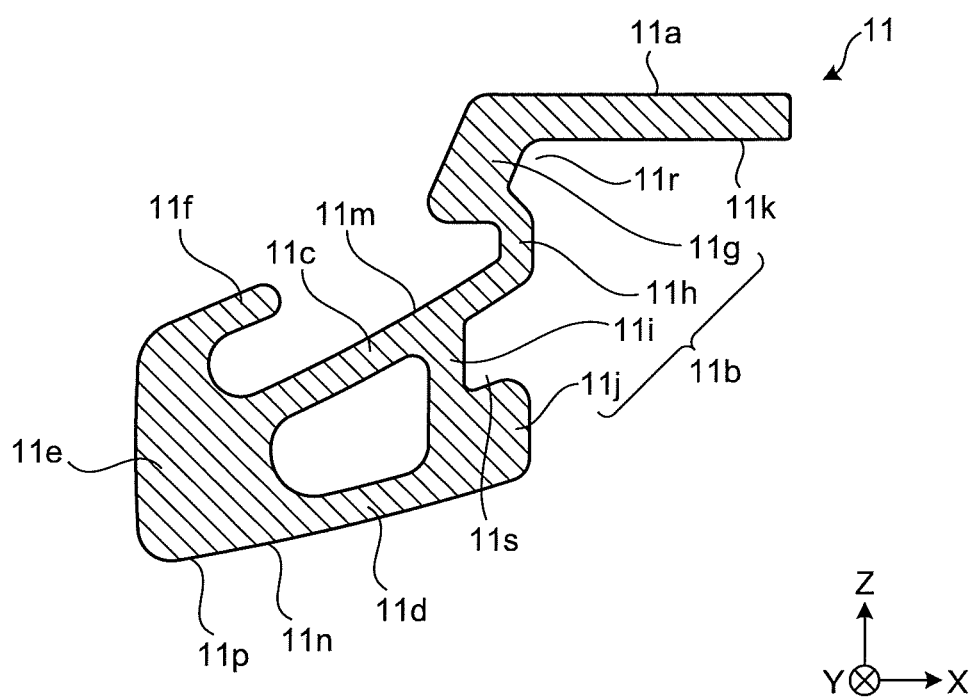
FIG. 3 is a sectional view of FIG. 2 along line III-III.

FIG. 3 is a sectional view of FIG. 2 along line II-III. As illustrated in FIG. 3, the upper sash 11 includes walls that include a glass-run holding bottom wall 11a, a central wall 11b, a weather-strip holding bottom wall 11c, an inner peripheral wall 11d, a vehicle interior-side wall lie, and a projecting wall 11f. The glass-run holding bottom wall 11a is also referred to as an extension, the central wall 11b as a vehicle exterior-side wall, the weather-strip holding bottom wall 11c as an outer peripheral sidewall, and an inner peripheral wall lid as an inner peripheral sidewall.

The central wall 11b extends from a vehicle interior-side end of the glass-run holding bottom wall 11a toward the inner periphery. The central wall 11b includes steps 11g to 11j in order from the outer periphery to the inner periphery, and has an uneven shape. The step 11g projects toward a vehicle interior, and the step 11h projects toward a vehicle exterior. The step 11i projects toward a vehicle interior and the step 11j projects toward a vehicle exterior. The upper sash 11 is provided with recesses 11r and 11s. The recess 11r is surrounded by the glass-run holding bottom wall 11a, the step 11g, and the step 11h. The recess 11s is surrounded by the step 11h, the step 11i, and the step 11j.

The weather-strip holding bottom wall 11c and the inner peripheral wall 1id extend from the central wall 11b toward a vehicle interior. The vehicle interior-side wall 11e connects the weather-strip holding bottom wall 11c and the inner peripheral wall 11d. The projecting wall 11f projects from the vehicle interior-side wall 11e toward the outer periphery.

The upper sash 11 also includes a glass-run holder 11k. The glass-run holder 11k is formed of the glass-run holding bottom wall 11a and the central wall 11b. A glass run is fitted into (recesses 11r and 11s) the glass-run holder 11k. That is, the glass-run holder 11k holds the glass run. The glass run catches on each of the steps 11g to 11j in the central wall 11b and is thereby prevented from dropping off.

The upper sash 11 also includes a weather-strip holder 11m. The weather-strip holder 11m is formed of the central wall 11b (steps 11g and 11h), the weather-strip holding bottom wall 11c, a top part of the vehicle interior-side wall 11e, and the projecting wall 11f. A weather strip is fitted into the weather-strip holder 11m. That is, the weather-strip holder 11m holds the weather strip. The weather-strip holder 11m has a box-like section with a bottom open to the outer periphery. The projecting wall 11f and the step 11g work to prevent the weather strip from dropping off from the weather strip holder 11m.

The upper sash 11 includes a frame 11n formed by the glass-run holding bottom wall 11a, the central wall 11b, the weather-strip holding bottom wall 11c, the inner peripheral wall 11d, and the vehicle interior-side wall 11e. The frame 11n has a hollow shape surrounded by the step 11i of the central wall 11b, the weather-strip holding bottom wall 11c, the inner peripheral wall 11d, and the vehicle interior-side wall 11e. Specifically, the frame 11n has a closed section formed by annularly connecting the step 11i of the central wall 11b, the weather-strip holding bottom wall 11c, the inner peripheral wall 11d, and the vehicle interior-side wall 11e. The frame 11n extends in a longitudinal direction of the upper sash 11. The frame 11n as structured above works to enhance the rigidity of the upper sash 11.

Figure 4:
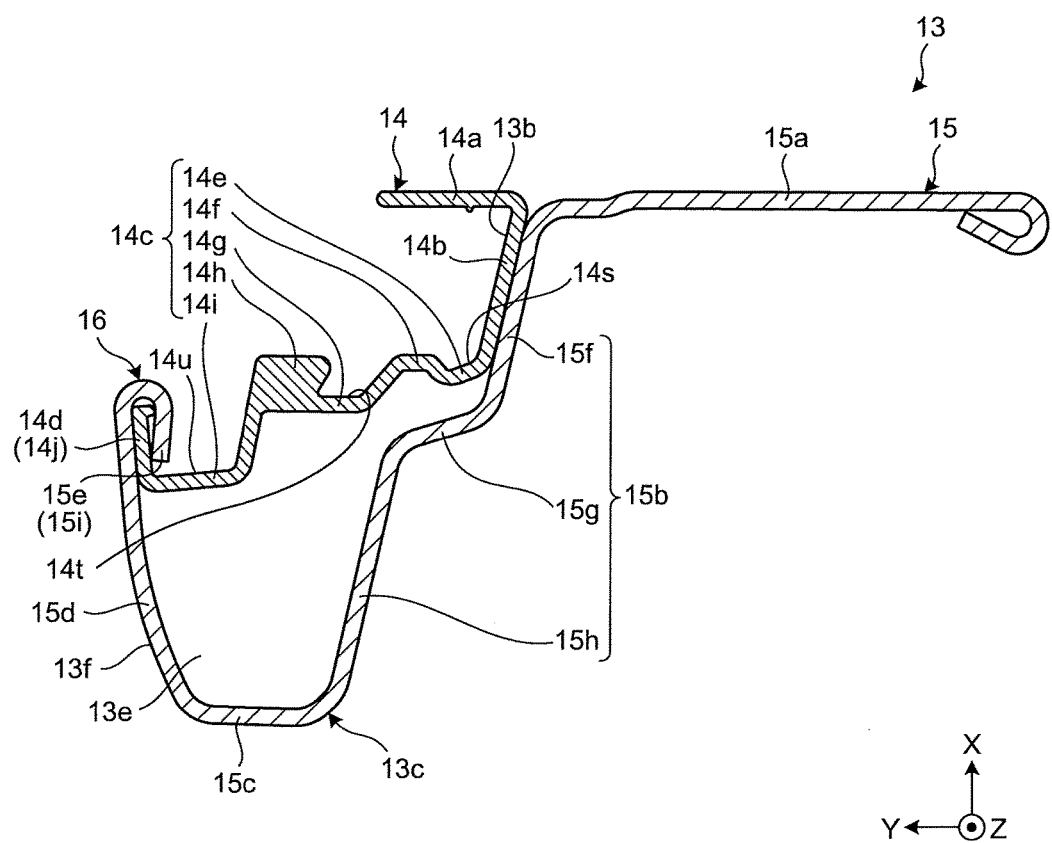
FIG. 4 is a sectional view of FIG. 2 along line IV-IV.

FIG. 4 is a sectional view of FIG. 2 along line IV-IV. As illustrated in FIG. 4, the side sash 13 includes an outer member 14 and an inner member 15. The outer member 14 and the inner member 15 both extend in a vertical direction. The outer member 14 and the inner member 15 are superposed and joined to each other in a horizontal direction. The outer member 14 is also referred to as a glass run channel.

The outer member 14 is a long member that is formed of a metal plate material by roll-molding and press-molding. Examples of the material of the outer member 14 include iron and aluminum. The outer member 14 includes walls that include a vehicle exterior-side wall 14a, a glass-run holding bottom wall 14b, a central wall 14c, and a terminal wall 14d. The central wall 14c is also referred to as a vehicle interior-side wall.

The vehicle exterior-side wall 14a is on the vehicle exterior side of the outer member 14. The glass-run holding bottom wall 14b extends from an outer peripheral end of the vehicle exterior-side wall 14a toward a vehicle interior. The central wall 14c extends from the glass-run holding bottom wall 14b toward the inner periphery. The central wall 14c includes steps 14e to 14i in order from the outer periphery to the inner periphery, and has an uneven shape. The step 14e is connected to the glass-run holding bottom wall 14b, and projects toward a vehicle interior. The step 14f is connected to the step 14e, and projects toward a vehicle exterior. The step 14g is connected to the step 14f, and projects toward a vehicle interior. The step 14h is connected to the step 14g, and projects toward a vehicle exterior. The step 14i is located between the step 14h and the terminal wall 14d, and projects toward a vehicle interior. The terminal wall 14d is bent from an inner peripheral end of the central wall 14c toward a vehicle exterior.

The outer member 14 is also provided with recesses 14s to 14u. The recess 14s is surrounded by the glass-run holding bottom wall 14b, the step 14e, and the step 14f. The recess 14t is surrounded by the step 14f, the step 14g, and the step 14h. The recess 14u is surrounded by the step 14h, the step 14i, and the terminal wall 14d. The side sash 13 includes a vertically extending outer face 13f provided with the recesses 14s to 14u. The recesses 14s to 14u vertically extend and are recessed toward an internal space 13e of the side sash 13.

The inner member 15 is a long member formed of a metal plate material by roll-molding and press-molding. Examples of the material of the inner member 15 include iron and aluminum. The inner member 15 includes walls that include a vehicle exterior-side wall 15a, a bottom wall 15b, a vehicle interior-side wall 15c, an inclined wall 15d, and a folded wall 15e. At least a part of the inner member 15 (for example, the vehicle interior-side wall 15c) is located on a vehicle interior side (in FIGS. 4 and 5, a bottom side) of the outer member 14. The bottom wall 15b is also referred to as an extension, and the inclined wall 15d is also referred to as an inner peripheral sidewall.

The vehicle exterior-side wall 15a of the inner member 15 is on the vehicle exterior side. The bottom wall 15b extends from an inner peripheral end of the vehicle exterior-side wall 15a toward a vehicle interior. The bottom wall 15b includes an inclined wall 15f, a connecting wall 15g, and an inclined wall 15h. The inclined wall 15f is located closer to the inner periphery and the vehicle interior than the vehicle exterior-side wall 15a. The connecting wall 15g connects a vehicle-interior side end of the inclined wall 15f and a vehicle-exterior side end of the inclined wall 15h. The vehicle interior-side wall 15c extends from the inclined wall 15h of the bottom wall 15b toward the inner periphery. The inclined wall 15d is gradually inclined toward the inner periphery as extending from the vehicle interior-side wall 15c toward a vehicle exterior. The folded wall 15e is folded from a vehicle exterior-side end (inner peripheral end) of the inclined wall 15d toward the bottom wall 15b and the vehicle interior. The folded wall 15e is included in an inner peripheral end 15i of the inner member 15.

Figure 5:
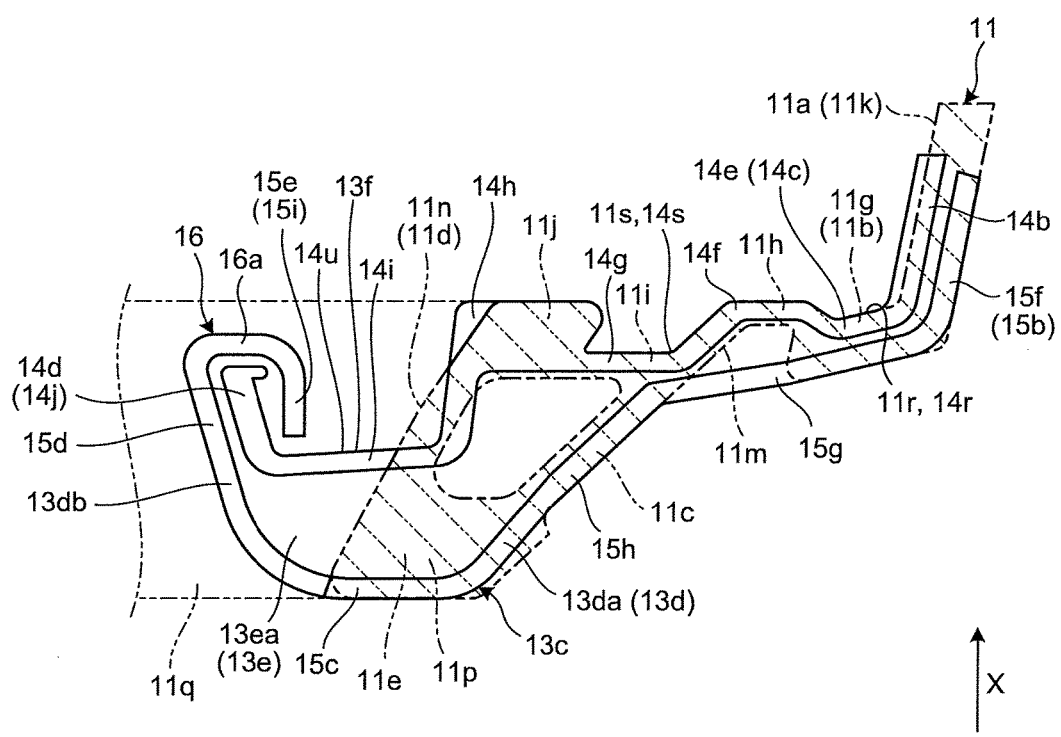
FIG. 5 is a sectional view of FIG. 2 along line V-V.

In the side sash 13, the bottom wall 15b of the inner member 15 is superposed on the outer periphery of the glass-run holding bottom wall 14b of the outer member 14, and is joined by welding such as spot welding. The glass-run holding bottom wall 14b and the bottom wall 15b are partially separated from each other except for the spot-welded part (FIG. 5). The glass-run holding bottom wall 14b and the bottom wall 15b may contact each other entirely in a vertical direction. An inner peripheral end 14j of the outer member 14 and the inner peripheral end 15i of the inner member 15 are joined to each other by a hemming joint 16. The end 14j is surrounded by the folded end 15i, forming the hemming joint 16. The hemming joint 16 is hemmed by inserting a part of a hemming device into the recess 14u.

The side sash 13 also includes a glass-run holder 13b. The glass-run holder 13b includes the vehicle exterior-side wall 14a, the glass-run holding bottom wall 14b, and the central wall 14c (steps 14e to 14h) of the outer member 14. A glass run is fitted into the glass-run holder 13b. In other words, the glass-run holder 13b holds the glass run. The glass-run holder 13b has a box-like section with a bottom open toward the inner periphery.

The side sash 13 includes a hollow frame 13c formed by the glass-run holding bottom wall 14b, the central wall 14c, and terminal wall 14d of the outer member 14, the bottom wall 15b, the vehicle interior-side wall 15c, the inclined wall 15d, and the folded wall 15e of the inner member 15, and the hemming joint 16. A vertical part of the hollow frame 13c is partially open in a horizontal direction (FIG. 5). The hollow frame 13c may be annularly closed entirely in a vertical direction. The frame 13c is provided with the internal space 13e. The frame 13c extends from the top end to the fixture 13a of the side sash 13. Such a frame 13c works to enhance the rigidity of the side sash 13.

In the general section of the side sash 13 except for the corner 1c, a weather strip channel (not illustrated) is fixed onto the outer peripheral face of the bottom wall 15b of the inner member 15 (opposite to the superposed bottom wall 15b and glass-run holding bottom wall 14b of the outer member 14). The weather strip channel, and the vehicle exterior-side wall 15a and the bottom wall 15b of the inner member 15 form the weather strip holder. A weather strip is fitted into the weather-strip holder. In other words, the weather-strip holder holds the weather strip. With the front door 100 closed, a part of the weather strip abuts on the bottom wall 15b and the edge of a door aperture of the vehicle body so as to liquid-tightly seal the front door 100 and the vehicle body.

The vehicle exterior-side wall 14a of the outer member 14 and the vehicle exterior-side wall 15a of the inner member 15 form a design surface of the side sash 13. The vehicle exterior-side wall 14a and the vehicle exterior-side wall 15a are covered from outside by a garnish (not illustrated) that is an exterior member.

The following describes a joint structure of the upper sash 11 and the side sash 13 at the corner 1c. As illustrated in FIG. 2, a rear end face 11p of the upper sash 11 and a top end face 13d of the side sash 13 abut on and are joined to each other at the corner 1c. The rear end face 11p of the upper sash 11 is the rear end face (end face) of the upper sash 11 and the frame 11n, and the top end face 13d is the top end face (end face) of the side sash 13 and the frame 13c. The rear end face 11p is an example of a first end face, and the top end face 13d is an example of a second end face.

The rear end face 11p extends in an oblique direction D1 crossing a horizontal direction and a vertical direction. In the embodiment, the oblique direction D1 is directed rearward and obliquely upward.

FIG. 5 is a sectional view of FIG. 2 along line V-V. As illustrated in FIGS. 2 and 5, the top end face 13d includes an inclined face 13da and an inner peripheral face 13db. The inclined face 13da extends in the oblique direction D1 to abut on the rear end face 11p. In other words, the inclined face 13da extends along the rear end face 11p. The inclined face 13da is an example of a first face.

The inner peripheral face 13db is inclined with respect to the inclined face 13da and directed upward. The inner peripheral face 13db is on the inner peripheral side of the inclined face 13da, and extends forward from the inclined face 13da. As illustrated in FIG. 2, the inner peripheral face 13db is located between a plane P extending from the inclined face 13da in the oblique direction D1 and an outer face 11q (area B in FIG. 2). The plane P is a virtual plane. In the embodiment, the inner peripheral face 13db extends along a lower outer face 11q of the frame 11n of the upper sash 11. Specifically, the outer face 11q is an outer face of the inner peripheral wall 11d. The inner peripheral face 13db may abut on the outer face 11q or may be separated from the outer face 11q. The inner peripheral face 13db is an example of a second face.

The inner peripheral face 13db is also provided with an aperture 13ea being one end of the internal space 13e of the frame 13c. In other words, the internal space 13e is open to the inner peripheral face 13db. In the embodiment, the aperture 13ea extends through the inclined face 13da and the inner peripheral face 13db. In other words, the inner peripheral face 13db is provided with a part of the aperture 13ea. The inner peripheral face 13db also includes a top end face 16a of the hemming joint 16. The top end of the recess 14u is open to the inner peripheral face 13db. In the embodiment, the recess 14u is open to the inclined face 13da and the inner peripheral face 13db. In other words, the top end of the recess 14u is partially open to the inner peripheral face 13db.

As illustrated in FIGS. 2 and 5, the inner peripheral face 13db, the aperture 13ea in the inner peripheral face 13db, the end face 16a of the hemming joint 16, and the recess 14u in the inner peripheral face 13db are covered by the outer face 11q. The inner peripheral face 13db, the aperture 13ea, the end face 16a, and the recess 14u may be covered by the outer face 11q with the inner peripheral face 13db abutting on the outer surface 11q or spaced apart from the outer face 11q.

In the embodiment, at the corner 1c, the steps 11g to 11j of the upper sash 11 and the steps 14e to 14h of the side sash 13 are superposed on each other, respectively. Thus, the recesses 11r and 11s of the upper sash 11 and the recesses 14r and 14s of the side sash 13 are connected to each other. The recess 14u of the side sash 13 is covered by the outer face 11q of the upper sash 11.

As described above, in the embodiment, the top end face 13d includes the inclined face 13da that extends in the oblique direction D1 to abut on the rear end face 11p, and the inner peripheral face 13db that is directed upward and is provided with the aperture 13ea being one end of the internal space 13e of the frame 13c. The outer face 11q covers the inner peripheral face 13db and the aperture 13ea. This, for example, can prevent air from entering the internal space 13e through the aperture 13ea during traveling of a vehicle, preventing occurrence of wind noise.

In the embodiment, the side sash 13 includes the outer member 14 that extends in a vertical direction, the inner member 15 that extends along the outer member 14, and the hemming joint 16 including the end 14j of the outer member 14 surrounded by the folded end 15i of the inner member 15. The inner peripheral face 13db includes the end face 16a of the hemming joint 16. Thus, according to the embodiment, it is possible to prevent air from entering the gap between the end 14j and the end 15i of the hemming joint 16 from an end face 16a during traveling of a vehicle, for example, preventing occurrence of wind noise.

In the vehicle door frame, for example, the lower outer face of the upper sash covers the second face and the aperture so as to prevent air from entering the internal space through the aperture. This can prevent occurrence of wind noise.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. The specification of each component (structure, kind, direction, shape, size, length, width, thickness, height, number, arrangement, position, material, and the like) can be changed as appropriate. For example, the door for a vehicle can be a rear door.

What is claimed is:

1. A vehicle door frame comprising:
   an upper sash that includes a first end face and a lower outer face, the first end face located in a top corner of a vehicle door and extending in an oblique direction which is oblique with respect to a horizontal direction and a vertical direction, the lower outer face being different from the first end face and extending from the first end face in a longitudinal direction of the upper sash; and
   a side sash that includes a second end face located in the corner, and an internal space, wherein
   the second end face includes a first section and a second section,
   the first section extending in the oblique direction to abut on the first end face,
   the second section located between a plane in which the first section is disposed and the lower outer face,
   the second section inclined with respect to the plane to face upward in the vertical direction, and
   the second section provided with an aperture opening to the internal space, and
   the lower outer face covers the second section and the aperture.

2. The vehicle door frame according to claim 1, wherein the side sash includes an outer member, an inner member, and a hemming joint, the outer member extending in the vertical direction, the inner member that is at least partially located on a vehicle interior side of the outer member and extends along the outer member, the hemming joint including an end of the outer member surrounded by a folded end of the inner member, and
   the second section includes an end face of the hemming joint.

3. The vehicle door frame according to claim 1, wherein the side sash includes an outer face that extends in the vertical direction and is provided with a recess that is recessed toward the internal space and is open to the second section, and
   the lower outer face of the upper sash covers the recess.

* * * * *